US006505143B1

(12) United States Patent
Lakshminarasimha et al.

(10) Patent No.: US 6,505,143 B1
(45) Date of Patent: Jan. 7, 2003

(54) MACHINE PROTECTION SYSTEM FOR ROTATING EQUIPMENT AND METHOD

(75) Inventors: Arkalgud N. Lakshminarasimha, Marietta, GA (US); Richard J. Rucigay, Marietta, GA (US); Dincer Ozgur, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/488,033

(22) Filed: Jan. 20, 2000

(51) Int. Cl.$^7$ ................................................ G01H 11/00
(52) U.S. Cl. ......................... 702/183; 702/56; 73/660; 73/570
(58) Field of Search .............................. 702/183, 33–36, 702/42, 54, 56, 66, 71, 72, 73, 103, 105, 106, 108, 113–115, 129, 126, 127, 141, 145–148, 151, 163, 168, 182, 184, 185, 188, 189, 177, 178, 194, 199, FOR 154, FOR 167, FOR 170, FOR 171, FOR 123–FOR 126, FOR 134, FOR 135, FOR 136, FOR 141, FOR 144, FOR 150, FOR 151; 340/679, 680, 683; 360/73.03, 77.06; 73/570, 579, 583, 543, 602, 645, 646, 657–662, 801, 802, 116, 862, 41, 862.59, 496, DIG. 1, 457; 700/275, 280, 80, 79, 279

(56) References Cited

U.S. PATENT DOCUMENTS

| 3,562,477 A | | 2/1971 | Macmanus ..................... 219/68 |
| 5,258,923 A | | 11/1993 | Imam et al. .................. 702/36 |
| 5,277,063 A | * | 1/1994 | Thomas ........................ 73/457 |
| 5,502,650 A | | 3/1996 | Naruse et al. ............... 700/279 |
| 5,544,073 A | * | 8/1996 | Piety et al. .................. 700/279 |
| 5,922,963 A | * | 7/1999 | Piety et al. ................... 73/659 |
| 5,936,787 A | | 8/1999 | Ohmi ...................... 360/73.03 |
| 6,098,022 A | * | 8/2000 | Sonnichsen et al. .......... 702/35 |
| 6,263,738 B1 | * | 7/2001 | Hogle .......................... 73/593 |
| 6,321,602 B1 | * | 11/2001 | Ben-Romdhane ............ 73/593 |

FOREIGN PATENT DOCUMENTS

WO   WO 99/20992   4/1999

OTHER PUBLICATIONS

"39$^{th}$ GE Turbine State-of-the-Art Technology Seminar", Tab 1,""F" Technology—the First Half Million Operating Hours", H.E. Miller, Aug. 1996.
"39$^{th}$ GE Turbine State-of-the-Art Technology Seminar", Tab 2, "GE Heavy-Duty Gas Turbine Performance Characteristics", F. J. Brooks, Aug. 1996.

(List continued on next page.)

*Primary Examiner*—Hal Wachsman
(74) *Attorney, Agent, or Firm*—Nixon & Vanderhye P.C.

(57) ABSTRACT

A machine protection system and method for rotating equipment introduces new alarming features and makes use of full proximity probe sensor information, including amplitude and phase. Baseline vibration amplitude and phase data is estimated and tracked according to operating modes of the rotating equipment. Baseline vibration and phase data can be determined using a rolling average and variance and stored in a unit circle or tracked using short term average and long term average baselines. The sensed vibration amplitude and phase is compared with the baseline vibration amplitude and phase data. Operation of the rotating equipment can be controlled based on the vibration amplitude and phase.

7 Claims, 3 Drawing Sheets

OTHER PUBLICATIONS

"39th GE Turbine State–of–the–Art Technology Seminar", Tab 3, "9EC 50Hz 170–MW Class Gas Turbine", A.S. Arrao, Aug. 1996.

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines—Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems, for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, Performance and Reliability Improvements for Heavy–Duty Gas Turbines, J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, Vol. 2–Industrial Machine, Mar. 31, 1997, Morgantown, WV.

"Advanced Turbine Systems (ATS Program) Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.
"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176–11.
"Exhibit panels used at 1995 product introduction at PowerGen Europe".
"Extensive Testing Program Validates High Efficiency, reliability of GE's Advanced "H" Gas Turbine Technology", Press Information, Press Release, 96–NR14, Jun. 26, 1996, H Technology Tests pp. 1–4.
"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp.1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Businesses Share Technologies and Experts to Develop State–Of–The–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency for GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the 21$^{st}$Century —"H" Gas Turbine Combined Cycles", Thomas C. Paul et al., Report.
"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct., 1995.
"Proceedings of the Advanced Turbine Systems Annual Program Review Meeting", vol. I, "Overview of Westinghouse's Advanced Turbine Systems Program", Bannister et al., pp. 22–30, Oct., 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I, "Advanced Turbine Systems, Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct., 1995.
"Proceedings of the Advanced Turbine Systems Annual Program Review Meeting", vol. I, "General Electric ATS Program Technical Review Phase 2 Activities", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct., 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct., 1995.
"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Stem Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement"M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515 Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_X$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552, Nov., 1996.

"Proceedings of the Advanced Turbine Systems Annual Program Review Meeting", "ATS Materials Suport", Michael Karnitz, pp. 553–576, Nov., 1996.

"Proceedings of the Advanced Turbine Systems Annual Program Review Meeting", "Land Based Turbine Casting Initiative", Boyd A. Meuller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, pp. 671, Nov., 1996.

"Status Report: The U.S. Department of of Energy's Advanced Turbine Systems Program", facsimile dated Nov. 7, 1996.

"Testing Program Results Validate GE's H Gas Turbine—High Efficiency, Low Cost of Eelctricity and Low Emissions", Roger Schonewald and Patrick Marolda, (no date available).

"Testing Program Results Validate GE's Gas Turbine—High Efficiency, Low Cost of Eelctricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176–5628.

"Utility Advanced Turbine System (ATS) Technology Readiness Testing—Phase 3", Document #666274 Oct. 1, 1996–Sep. 30, 1997, Publication Date, Dec. 31, 1997, Report Numbers: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176 5340.

"Utility Advanced Turbine System (ATS) Technology Readiness Testing and Pre–Commercial Demonstration, Phase 3", Document #486132, Apr. 1–Jun. 30, 1976, Publication Date, Dec. 31, 1996, Report Numbers: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Numbers: DOE/MC31176–5339.

"Utility Advanced Turbine System (ATS) Technology Readiness Testing and Pre–Commercial Demonstration," Document #666277, Apr. 1–Jun. 30, 1997, Publication Date, Dec. 31, 1997, Report Numbers: DOE/MC/31176–8.

"Utility Advanced Turbine System (ATS) Technology Readiness Testing and Pre–Commercialization Demonstration"Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Numbers: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May, 1, 1999, Report Numbers: DE–FC21–95MC31176–20.

"Utility Advanced Turbine System (ATS) Technology Readiness Testing", Document #1348, Apr. 1–Jun. 29, 1998, Publication Date Oct. 29, 1998, Report Numbers DE–FC21–95MC31176–18.

"Utility Advanced Turbine System (ATS) Technology Readiness Testing—Phase 3", Annual Technical Progress Report, Reporting Period: Oct. 1, 1996–Sep. 30, 1997.

"Utility Advanced Turbine System (ATS) Technology Readiness Testing and Pre–Commercial Demonstration", Quarterly Report, Jan. 1–Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

| Gas Turbine Mode | Gas Turbine Condition | M&D Integer Mode Value |
|---|---|---|
| OFF/Unknown | Transient | 0 |
| Slow Roll/Cranking | Transient | 1 |
| Accelerate - LO | Transient | 2 |
| Accelerate-HI | Transient | 3 |
| Coastdown - HI | Transient | 4 |
| Coastdown -LOI | Transient | 5 |
| | | |
| FSNL | Transient | 6 |
| Part Load Range 1 | Transient | 7 |
| Part Load Range 2 | Transient | 8 |
| Part Load Range 3 | Transient | 9 |
| Full Load | Transient | 10 |
| Base Load | Transient | 11 |
| Peak Load | Transient | 12 |
| | | |
| FSNL | Steady State | 13 |
| Part Load Range 1 | Steady State | 14 |
| Part Load Range 2 | Steady State | 15 |
| Part Load Range 3 | Steady State | 16 |
| Full Load | Steady State | 17 |
| Base Load | Steady State | 18 |
| Peak Load | Steady State | 19 |
| | | |
| FSNL | Load Transition | 20 |
| Part Load Range 1 | Load Transition | 21 |
| Part Load Range 2 | Load Transition | 22 |
| Part Load Range 3 | Load Transition | 23 |
| Full Load | Load Transition | 24 |
| Base Load | Load Transition | 25 |
| Peak Load | Load Transition | 26 |

MACHINE PROTECTION SYSTEM FOR ROTATING EQUIPMENT AND METHOD

This invention was made with Government support under Contract No. DE-FC21-95MC-31176 awarded by the Department of Energy. The Government has certain rights in this invention.

BACKGROUND OF THE INVENTION

This invention relates to turbo-machinery vibration protection systems and, more particularly, to a machine protection system architecture using vector averaging and vector-based anomaly detection with estimated proximity probe vibration baselines.

An important prerequisite of any machine protection system (MPS) or a condition monitoring system (CMS) is fault detection. Equipment condition (static or dynamic) is determined through a set of sensor measurements that provides thermal, force, motion, chemical, optical and other related information. Equipment malfunctions or excursions from normal operational domains are then determined by identifying which sensor (or set of sensors) measurements have exceeded their set limits. Thus, detection of anomalies in sensor measurements is important for fault detection.

Typical turbo-machinery vibration protection systems utilizing proximity probe data use only amplitude information. A system that uses both amplitude and phase is not available. Similarly, most machinery protection systems algorithms only perform overall amplitude limit checking. Algorithms based on baseline comparisons are similarly not available.

There are three types of vibration measurements, i.e., displacement, velocity and acceleration. Even though velocity and acceleration are vector quantities, only amplitude values of these quantities are typically used in measuring and estimating alarm limits. Vibration displacement estimation, however, should include measurement of both amplitude and phase.

BRIEF SUMMARY OF THE INVENTION

In an exemplary embodiment of the invention, a machine protection system for rotating equipment includes a control system and a vector sensor unit communicating with the control system that senses vibration amplitude and phase. The control system controls operation of the rotating equipment based on the vibration amplitude and phase. The vector sensor unit preferably includes a proximity probe and an angle position sensor. The control system may include a memory storing baseline vibration amplitude and phase data in a unit circle, and a comparison unit that compares the sensed vibration amplitude and phase with the baseline vibration amplitude and phase data. In this context, the memory stores separate baseline vibration amplitude and phase data according to an operating mode of the rotating equipment. A comparison unit outputs a signal based on the comparison, and a central processing unit of the control system controls the operation of the rotating equipment based on the signal from the comparison unit.

In another exemplary embodiment of the invention, a method of operating a machine protection system for rotating equipment includes the steps of sensing vibration amplitude and phase of the rotating equipment, and controlling operation of the rotating equipment based on the vibration amplitude and phase. The stored baseline amplitude and phase data may be determined using a rolling average and variance. The method may include tracking the baseline amplitude and phase data using short term average and long term average baselines. The short term averages are preferably determined on a minute-by-minute basis using data accumulated over an hour, and the long term averages are preferably determined in quarter-hour intervals using data accumulated over 100 hours. Spikes that exceed two times a standard deviation are discounted. In one arrangement, the baseline amplitude and phase data is entered manually. In this context, after collecting a predefined number of data values, the manually entered baseline amplitude and phase data is updated based on the predefined number of data values. If the sensed vibration amplitude and phase exceed the baseline vibration amplitude and phase data by a preset deviation, an alarm is triggered. The triggering step may further include shutting down the rotating equipment.

DETAILED DESCRIPTION OF THE INVENTION

In the following detailed description, a gas turbine is used as an exemplary application of the anomaly detection and machine protection system of the present invention. Those of ordinary skill in the art will contemplate that the principles are applicable to any MPS or CMS that monitors or controls rotating equipment, such as for example, pumps, electric motors, steam turbines, hydraulic turbines, etc. The invention is thus not meant to be limited to the described application.

Normal equipment operational domain is characterized by baselines that describe variations in sensor values under specific operating conditions. Baselines can be static, transient or dynamic depending upon the type of sensor signal. Baseline values therefore define anomaly detection limits.

Anomalies can be detected by comparing the value of a variable, either discrete or continuous, to either a fixed or varying limit. Varying limits are determined through statistical means. Thus, anomalies can be determined by comparing current (sensed) values with a short term average, comparing the short term average values with long term average values, or comparing long term average values with an initial baseline value. Of course, other combinations of comparisons can also be made depending on the application. Sample size, time duration to estimate the averages, and threshold values to detect anomalies are dependent on the type of anomaly to be detected, i.e., vibration, combustion, or performance. Standard deviations for each of the time ranges are calculated to determine the quality of the sensor signal.

Typically, measurements of physical quantities requires information from multiple sensors. In order to calculate baseline values in these situations, vector averaging should be performed. Vibration displacement anomaly detection is used as a specific example to explain generally the anomaly detection procedure of the present invention.

Figure 1:
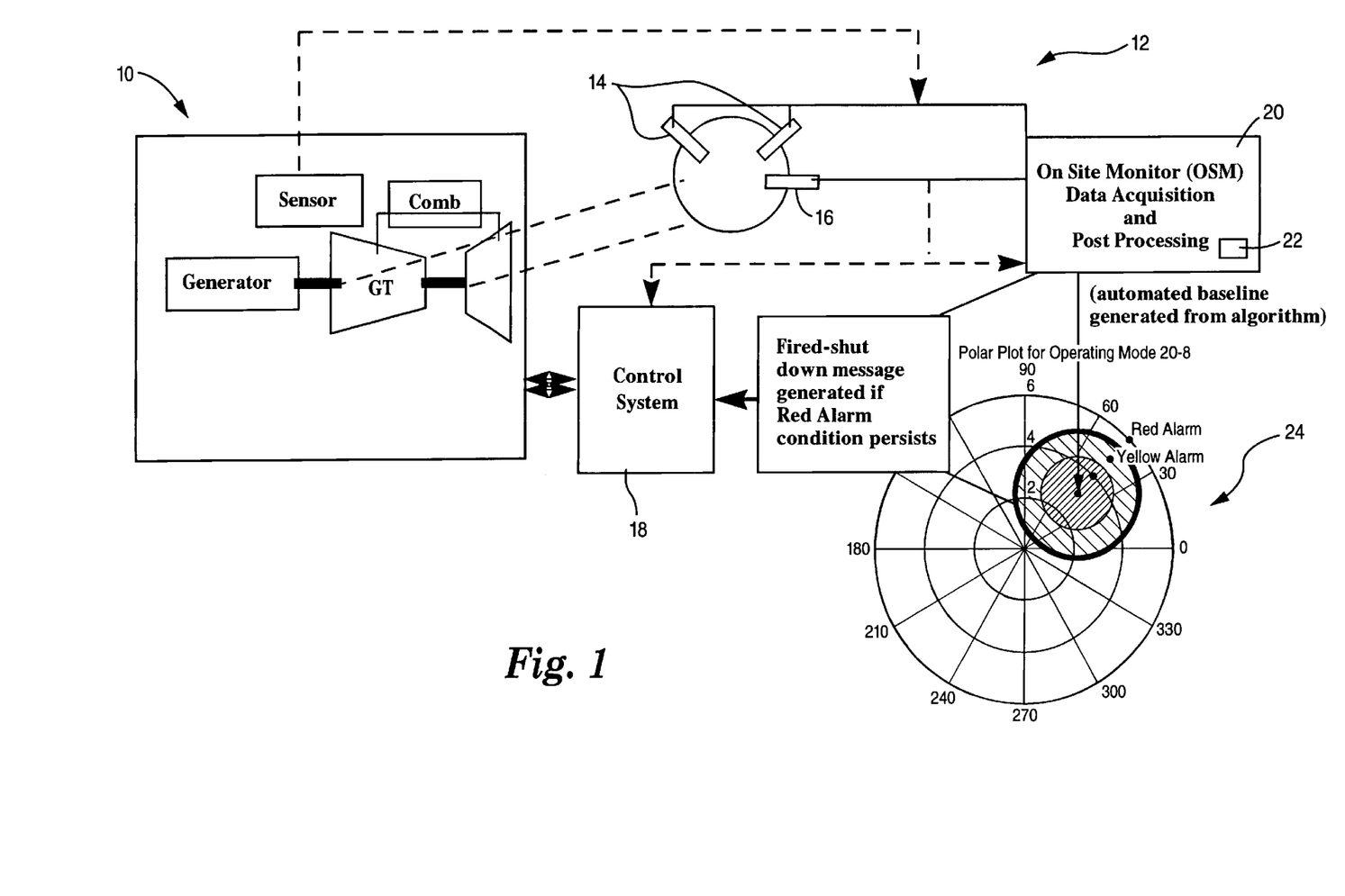
FIG. 1 is a schematic illustration of the automated vibration baseline tracking and machine protection system of the present invention.
Figure 3:
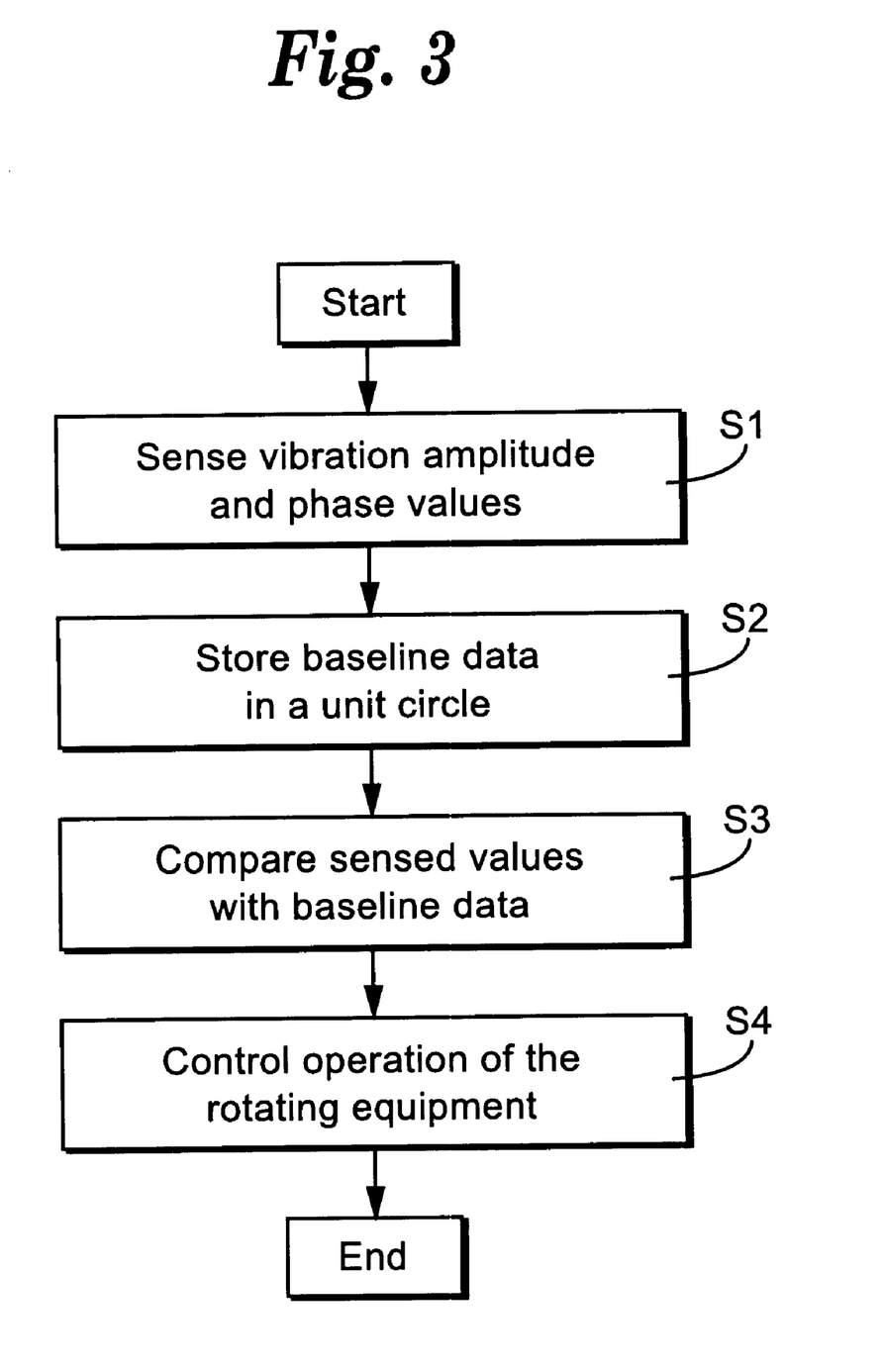
FIG. 3 is a flow chart showing the method of operating a machine protection system for rotating equipment.

FIG. 1 is a schematic illustration of a control loop for operation of a gas turbine 10, and FIG. 3 is a flowchart showing a method of operating a machine protection system for rotating equipment. A vector sensor unit 12 includes one or more proximity probes 14 and an angle position sensor 16. In the present embodiment, the angle position sensor 16 detects an angle position of the rotor. A control system 18, such as the General Electric Mark V control system controls the operation of the gas turbine 10. A processor 20 and memory 22 form part of the control system and receive data input from the vector sensor unit 12. The memory 22 stores baseline vibration amplitude and phase data in a unit circle 24 (step S2 in FIG. 3), which incorporates deviation ranges for triggering alarms.

Vibration temporal displacement is measured by the vector sensor unit 12 (step S1 in FIG. 3) and is characterized by both amplitude and phase. Vibration alarms are generated by comparing with a comparator in the control system 18 the proximity probe amplitude and phase measurements vectorially with a set of baseline displacement values, including baseline vibration amplitude and phase data (step S3 in FIG. 3).

As indicated in the illustrated unit circle 24, if the vector deviation is more than a first predetermined deviation, then a yellow alarm is generated; and if it is more than a second deviation, then a red alarm is generated. Upon generation of the red alarm, the control system 18 may be programmed to shut down the gas turbine 10. Similar baseline comparisons are utilized when generating seismic probe related vibration alarms. Unlike the vector sensor unit measurements, however, seismic probes do not have phase information available. Control of the rotating equipment operation is shown in step S4 in FIG. 3.

Figure 2:
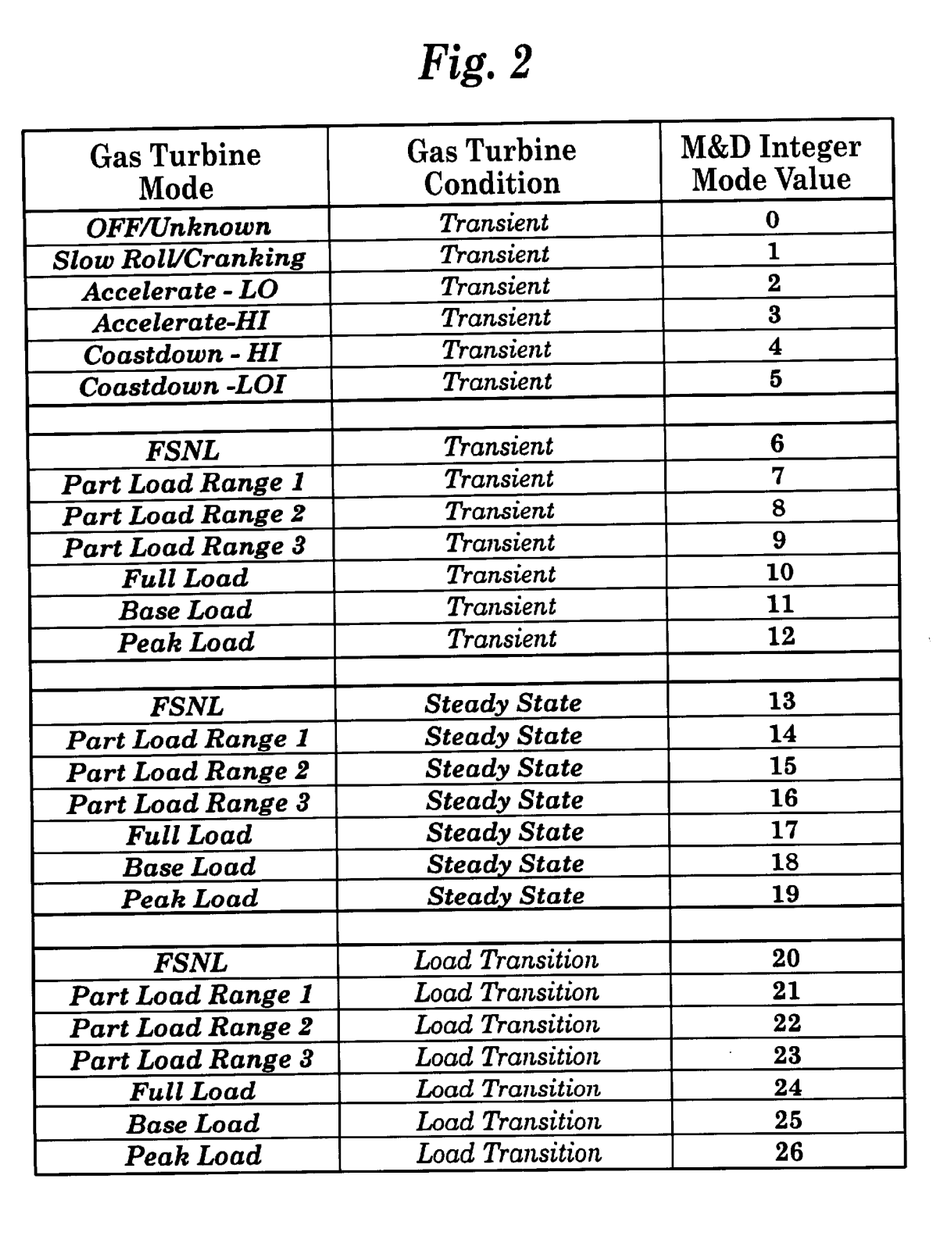
FIG. 2 is a table of gas turbine operating modes.

At a given time, the vibration level of a gas turbine depends upon a number of factors, such as type of design, alignment, bearing design, RPM, load, rotor temperatures, type of start, etc. Estimation of vibration baselines is therefore difficult. Referring to FIG. 2, a gas turbine operating mode parameter (GT-OPMODE) is used in determining the operating mode of the unit. Specific vibration limits and deviation criteria can be defined for each operation mode. Averaging calculations are performed for each of the several unique gas turbine operational modes. FIG. 2 is a table listing 26 gas turbine operating modes.

In order to estimate and track vibration baselines, rolling average and variance are used. Assuming N measurements of a parameter M is made within a time frame or window of T sec, rolling average is calculated as follows:

$$M = \text{SUM}(M_1, M_2, \ldots M_n)/N$$

where $M_1$ and $M_n$ are the measured values of first and last data reading. At any given reading, the first measurement is dropped and the last measurement is added in. Since the reading rate is not known, N is a variable. All calculations are performed when GT-OPMODE does not change for the period under consideration.

With respect to vibration vector averaging and variance, a comparison of alarm levels is made against the current (sensed) value and the baseline data. If the current value exceeds a preset deviation, depending upon the operating mode, an alarm is triggered. An alarm is also triggered if the standard deviation of the hourly averaged value is above a prescribed amount. Since the vector sensor unit measures both amplitude and phase, the deviation is estimated vectorially.

Deviation is estimated as the difference between measured and averaged value. Vector average of N measured vector variables <M> is estimated as follows:

$$<M\text{avg}> = \text{sqrt}((\Sigma Mx/N)^2 + (\Sigma My/N)^2)$$

where N is the total number of measurements, $Mx = <M>\cos\Theta$, $My = <M>\sin\Theta$.

$$<\Theta\text{avg}> = \text{atan}(\Theta My/\Theta Mx)$$

Measurement variation is obtained using:

$$DM = <M> - <M\text{avg}>$$

$$D\Theta = <\Theta> - <\Theta\text{avg}>$$

Variance/Spread in amplitude is obtained by:

$$SM = \text{sqrt}(\Theta(DM)^2/N)$$

Variance/Spread in phase is obtained by:

$$S\Theta = \text{sqrt}(\Theta(D\Theta)^2/N)$$

Variance/Spread is an important factor used in determining vibration baseline values and also in generating alarms if the spread is high.

In the case of proximity probe measurements, both amplitude and phase data are utilized in calculating rolling average, deviation, and spread. For seismic probes, the available amplitude scalar information should be used.

Two sets of averages are used to track baselines and detect anomalies—short and long term baselines. Under thermal transient conditions, soon after startup and the unit is loaded, short term average is estimated every minute, and long term average every fifteen minutes. Under steady state conditions, short term average is estimated using data accumulated over an hour. Long term average represents the most recent one hundred hours of data. Short term averages are used to estimate the long term average.

The estimated and stored parameters using short and long term historical data include amplitude, phase (for prox probes only), variance in amplitude, and variance in phase (for prox probes only).

With the described turbine application, short term average vibration baseline data is stored once every minute under GT-OPMODE 7 through 11 and every hour under GT-OPMODE 14 through 18. Spurious data points or spikes are data sets that have a spread of more than or less than twice the deviation and are not be used in averaging calculation.

Long term average data is stored every fifteen minutes under GT-OPMODE 7 through 11 and every 100 hours under GT-OPMODE 14 through 18. Spurious data sets are similarly not used in averaging calculation.

In some cases, such as soon after a major overhaul, automated vibration baseline tracking may not be successful. In such a case, vibration baselines are entered manually (e.g., through remote operation or the like).

An initialization option is provided to set the baseline values manually for new and overhauled systems. After a minimum number of values of data (e.g., 100 values) are collected, then the baseline values are updated based on operating information, if the particular GT-OPMODE criteria is satisfied.

Alarming of a parameter is carried out by comparing current or real time values with the baseline data and estimating the parameter deviation. In order to reduce noise in the signal, near real time values are estimated using an average data estimated using three to five data snapshots. If the deviation exceeds a certain amount, an alarm is generated.

Alarming will depend upon the type of vibration measurement. For vector sensor unit data, a vector comparison of the current vibration information relative to the baseline data should be carried out. For seismic data, since it is a scalar measurement, direct comparison between instantaneous and baseline values should be carried out.

Deviation from baseline is estimated as follows:

$$<DM> = <M\text{current}> - <MLT\_\text{baseline}>$$

if DM is greater than a first deviation Yellow alarm;

if DM is greater than a second deviation Red alarm;

if DM is greater than a third deviation then trigger station alarm.

Similar deviation patterns can be established for seismic probes.

Additionally, the current averaged data (three to five snapshots) is compared against the previous short term baseline data, the short term baseline data is compared against long term baseline data, and the long term baseline data is compared against initial state baseline data, all of which have parameters and deviation limits according to operating mode that triggers alarms.

In addition to alarming based on the baseline comparison described above, an option to alarm using absolute measurements is also desirable. There also may be an option to alarm on spreads.

Referring to FIG. 1, vibration data is continuously gathered by the processor 20 (OSM) and the current (instantaneous average of last five data sets) data is compared against the short and long term baseline data. In the event of an anomaly and depending on its type, either remote notification or communication with the control system 18 is established to perform station alarm, shut down or other functions.

With the structure and method according to the invention, a machine protection system architecture is provided that uses proximity probes as part of its system with vector averaging and vector based anomaly detection capabilities. Additionally, baseline vibration amplitude and phase data are automatically estimated according to machine operating modes. The resulting arrangement provides a new level of sophistication for vibration machine protection systems for rotating equipment.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of operating a machine protection system for rotating equipment, the method comprising:

(a) sensing vibration amplitude and phase of the rotating equipment;

(b) controlling operation of the rotating equipment based on the vibration amplitude and phase;

(c) determining the baseline vibration amplitude and phase data using a rolling average and variance and storing baseline vibration amplitude and phase data in a unit circle; and (d) comparing the sensed vibration amplitude and phase with the baseline vibration amplitude and phase data, wherein step (c) is practiced by storing separate baseline vibration amplitude and phase data according to an operating mode of the rotating equipment, and wherein step (d) comprises outputting a signal based on the comparison, step (b) being practiced by controlling the operation of the rotating equipment based on the signal output in step (d).

2. The method according to claim 1, wherein if the sensed vibration amplitude and phase exceed the baseline vibration amplitude and phase data by a preset deviation, the method comprises triggering an alarm.

3. The method according to claim 2, wherein the triggering step further comprises shutting down the rotating equipment.

4. A method of operating a machine protection system for rotating equipment, the method comprising:

(a) sensing vibration amplitude and phase of the rotating equipment;

(b) controlling operation of the rotating equipment based on the vibration amplitude and phase;

(c) storing baseline vibration amplitude and phase data in a unit circle;

(d) comparing the sensed vibration amplitude and phase with the baseline vibration amplitude and phase data, wherein step (c) is practiced by storing separate baseline vibration amplitude and phase data according to an operating mode of the rotating equipment, and wherein step (d) comprises outputting a signal based on the comparison, step (b) being practiced by controlling the operation of the rotating equipment based on the signal output in step (d); and (e) tracking the baseline amplitude and phase data using short term average and long term average baselines.

5. The method according to claim 4, further comprising determining short term average on a minute-by-minute basis using data accumulated over an hour, and determining long term average in quarter-hour intervals using data accumulated over 100 hours.

6. The method according to claim 5, wherein spikes that exceed two times a standard deviation are discounted.

7. A method of operating a machine protection system for rotating equipment, the method comprising:

(a) sensing vibration amplitude and phase of the rotating equipment;

(b) controlling operation of the rotating equipment based on the vibration amplitude and phase;

(c) storing baseline vibration amplitude and phase data in a unit circle by manually entering the baseline amplitude and phase data; and (d) comparing the sensed vibration amplitude and phase with the baseline vibration amplitude and phase data, wherein step (c) is practiced by storing separate baseline vibration amplitude and phase data according to an operating mode of the rotating equipment, and wherein step (d) comprises outputting a signal based on the comparison, step (b) being practiced by controlling the operation of the rotating equipment based on the signal output in step (d), and wherein after collecting a predefined number of data values, the method comprises updating the manually entered baseline amplitude and phase data based on the predefined number of data values.

* * * * *

UNITED STATES PATENT AND TRADEMARK OFFICE
CERTIFICATE OF CORRECTION

PATENT NO.    : 6,505,143 B1
DATED         : January 7, 2003
INVENTOR(S)   : Lakshminarasimha et al.

It is certified that error appears in the above-identified patent and that said Letters Patent is hereby corrected as shown below:

<u>Column 3,</u>
Line 67, delete "$<\Theta avg> = atan\ (\Theta My / \Theta Mx)$" and insert
-- $<\Theta avg> = atan\ (\Sigma My / \Sigma Mx)$ --.

<u>Column 4,</u>
Line 9, delete "$SM = sqrt\ (\Theta\ (DM)^2 / N\ )$" and insert -- $SM = sqrt\ (\Sigma(DM)^2 / N\ )$ --.
Line 12, delete "$S\Theta = sqrt\ (\Theta\ (D\Theta)2 / N\ )$" and insert -- $S\Theta = sqrt\ (\Sigma(D\Theta)^2 / N\ )$ --.

Signed and Sealed this

Twenty-seventh Day of May, 2003

JAMES E. ROGAN
*Director of the United States Patent and Trademark Office*